June 9, 1942. J. C. CROWLEY 2,285,569
TIRE INFLATOR
Filed April 24, 1940
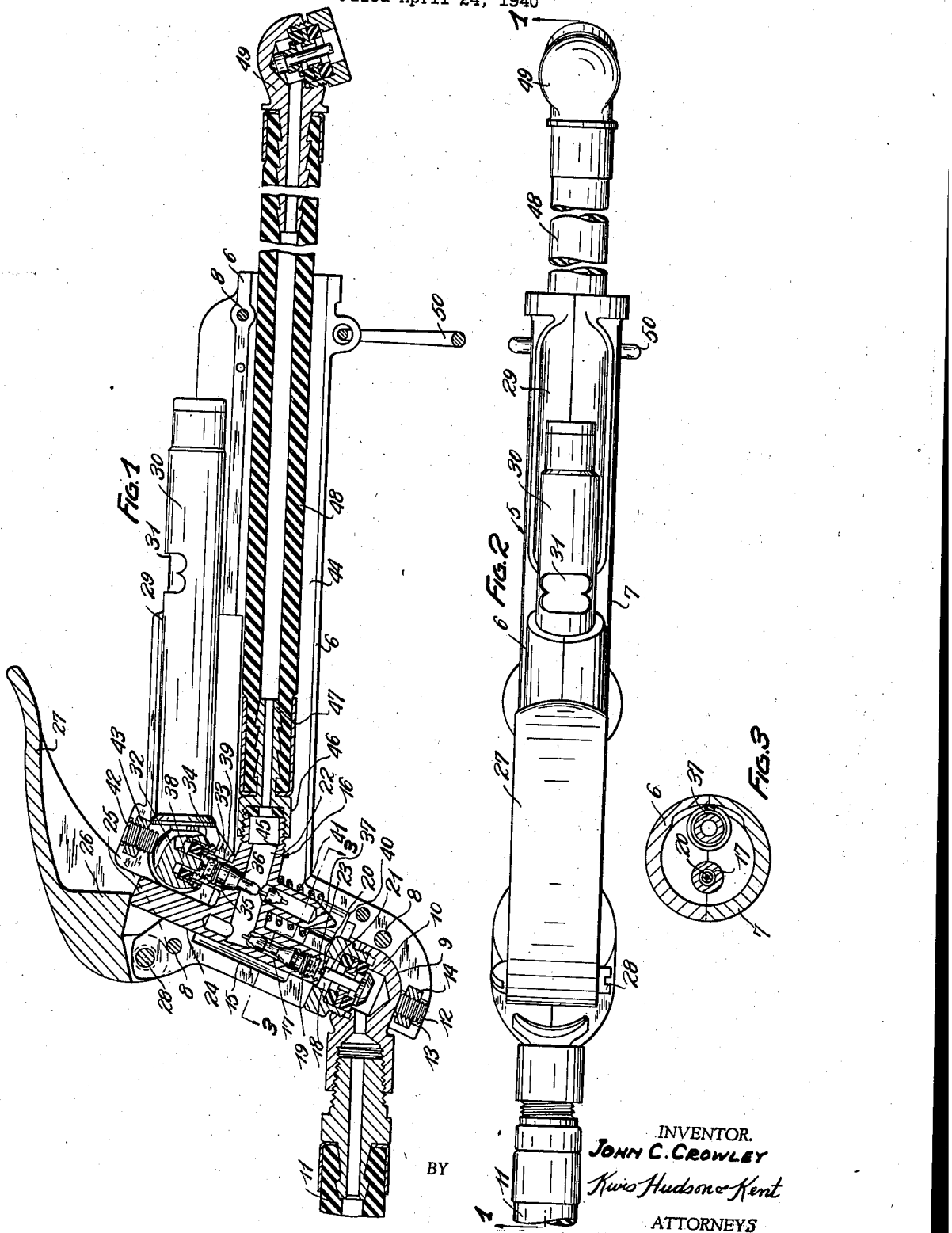
INVENTOR.
JOHN C. CROWLEY
BY Kwis Hudson & Kent
ATTORNEYS

UNITED STATES PATENT OFFICE 2,285,569

TIRE INFLATOR

John C. Crowley, Cleveland Heights, Ohio, assignor to The Dill Manufacturing Company, Cleveland, Ohio, a corporation of Ohio Application April 24, 1940, Serial No. 331,450

3 Claims. (Cl. 137—69.5)

This invention relates to a tire inflator and more particularly to a tire inflator which embodies means for determining the pressure in the tire.

The tire inflator embodying the present invention constitutes an improvement upon the tire inflator shown in Moody Patent No. 2,040,868, issued May 19, 1936.

One of the main objects of the present invention is to provide a tire inflator such as is shown in said Moody Patent 2,040,868 but wherein the pressure gauge and the air chuck on the end of the supply line are positively connected to the inflator yet can be disconnected therefrom without the necessity of disassembling the inflator.

Another important object of the invention is to provide a tire inflator of the type specified wherein certain operative parts of the inflator, such as the valve cores or insides can be removed or replaced without disassembling the inflator.

Further and additional objects and advantages not hereinbefore specified will become apparent hereinafter during the detailed description of an embodiment of the invention which is to follow.

Referring to the accompanying drawing illustrating said embodiment,

Fig. 1 is a longitudinal sectional view through the tire inflator and is taken substantially on line 1—1 of Fig. 2, looking in the direction of the arrows.

Fig. 2 is a top plan view of the inflator, and

Fig. 3 is a transverse sectional view, taken substantially on line 3—3 of Fig. 1, looking in the direction of the arrows.

The tire inflator shown in the drawing includes a split housing or casing 5 which comprises complementary sections 6 and 7. These sections are secured together in any convenient manner as by means of screws or bolts 8. The casing simulates the configuration of a pistol and has a gripping portion at one end which is at an angle to the axis of the main portion.

Recesses or substantially semi-spherical cavities are formed in the sections 6 and 7 and which provide a chuck cavity or chamber 9 at the inlet end to receive a chuck 10 on the end of a supply hose 11 from any suitable supply of air under pressure. The chuck 10 may be of any conventional type such as the "Dill" or "Schrader" types, although a "Dill" type chuck is shown herein by way of illustration.

The chuck 10 can be readily and positively positioned and secured in the cavity or chamber 9 by means of a setscrew 12. Likewise, of course, the chuck can be removed readily by loosening said setscrew when it is desired to disconnect the inflator from the supply hose 11, as, for example, at night when a gas station is closed.

The sections 6 and 7 of the casing 5 are provided on their undersides and adjacent to the semi-spherical recesses which form the cavity 9 with semi-circular complementary grooves extending from the undersides of the sections and terminating in the recesses. When the sections are assembled together these grooves form the cylindrical opening 13 indicated in Fig. 1. The sections intermediate the ends of the grooves are provided with laterally extending rectangular recesses which when the sections are assembled together non-rotatably house a nut 14 which threadedly receives the setscrew 12.

The casing 5 has another cavity or chamber 15 adjacent to the chuck chamber 9 for receiving the controlling or actuating devices. A body or member 16 is movably mounted in the chamber 15 and carries the valve operating the air transferring devices. A portion of the member 16 is provided with a bore 17 and has its open end 18 in juxtaposition or alignment with the open side of the air chuck 10 as shown in Fig. 1. The bore is shaped and threaded to removably receive the standard or conventional air valve "insides" 19 having a valve pin 20 which is adapted to coact with the projection or pin 21 of the chuck valve.

It will be noted that the "insides" 19 can be screwed into or from operative position without separating the casing sections and merely by removing the chuck and setscrew 12 and passing a suitable tool through the opening in the nut 14.

The bore 17 is in communication with a passage 22 extending laterally from the bore 17 and formed in the body or member 16. The body or member 16 is guided in its sliding movements in the chamber 15 by bearings 23 and 24, and has an upward projection 25 that extends outwardly of the casing. The outer end of the projection 25 is engaged by a lug 26 formed on the underside of an operating lever 27 which is pivotally connected as at 28 to the housing or casing 5 for operating the device as will presently be described.

Each section of the housing is also provided with a longitudinal semi-cylindrical cavity and when the sections 6 and 7 are assembled together these cavities form a gauge chamber 29 for receiving a gauge 30 which may be of any well known standard type, such as a "Dill" or "Schrader" gauge, but which is shown herein as of the "Dill" type wherein the numerals of the indicating member may be seen through a window or opening 31 in the side of the gauge cylinder.

The gauge 30 is provided with a chuck or connecting member 32 which has its face or opening 33 at a slight angle to the axis of the gauge. The body or member 16 is provided with a short upward cylindrical extension 34 and there is formed in this extension and in the body 16 a bore 35 shaped to receive a conventional air valve "insides" 36. The bore 35 is parallel to the bore 17 and is in communication with the passage 22. The bore 35 is also extended beyond the passage 22 and into a cylindrical extension 37 of the body 16. The open or outer end of the extension 34 is adapted to coact with the open side of the chuck or connecting member 32 while the valve pin of the "insides" 36 is adapted to cooperate with the pin of the chuck valve to effect unseating of said valve and also unseating of the valve of the "insides." The housing or casing 5 has bearings 39 and 40 for the extensions 34 and 37. A spring 41 mounted in the chamber 15 and surrounding the extension 37 of the body 16 normally maintains the open end of the extension 34 in contact with the gasket of the chuck 32, wherefore the pin 38 of said chuck contacts the pin of the "insides" 36 to normally unseat the valve of the "insides" and the gauge 30 is in communication with the passage 22. The spring 41 normally maintains the open end 18 of the bore 17 of the body 16 out of contact with the gasket of the chuck 10, wherefore the valve of said chuck and the valve of the "insides" 19 are normally closed.

The chuck 32 of the gauge is positively held in position by means of the setscrew 42 located in the upperside of the casing or housing 5 in a nut 43 mounted therein in a manner identical to the manner in which the nut 14 is mounted. The gauge may thus be positioned and clamped or locked in the inflator housing or casing by the setscrew 42 without requiring the separation of the sections 6 and 7. If it should be necessary to remove or replace the valve "insides" 36, the chuck 32 and setscrew 42 need only be removed and a suitable tool inserted through the nut 43 and into engagement with the valve "insides" 36.

The main longitudinal portions of the complementary sections 6 and 7 of the casing 5 have semi-cylindrical cavities running lengthwise thereof to form a chamber 44 which is substantially parallel with the gauge chamber 29 and which is adapted to enclose portions of the air conducting devices. The body 16 is provided with a tubular lateral extension 45 projecting into the chamber 44 and this extension is in communication with the passage 22 of the body 16. The extension 45 is externally threaded to receive the interiorly threaded portion 46 of a coupling fitting 47 which is connected to one end of a length of rubber hose 48 extending through the chamber 44 and outwardly of the inflator. The outer end of the hose 48 is connected to an air chuck 49 by means of which the inflator can be connected to the valve stem of a tire or other inflatable article as will be well understood. The inflator casing or housing 5 is provided with a loop 50 to enable the inflator to be hung up when not in use.

When a tire is to be inflated by means of the device described the operator grasps the housing in one hand and presses the chuck 49 onto the valve stem of the tire in the usual manner and which causes the tire valve and chuck valve to be opened thereby permitting air to enter the hose 48 and connected parts. In the normal position of the body 16, as already explained, the upper end of the extension 34 is pressed against the gauge chuck 32, and the valve of the insides 36 is open, thus providing a free passage for the air from the body to the gauge 30, wherefore the gauge will indicate the air pressure in the tire. At this time the valves of the chuck 10 and "insides" 19 are closed and air from the source of supply does not enter the body 16. If the gauge indicates more air pressure is needed in the tire the operator presses the handle 27 downwardly to move the body 16 against the action of the spring 41 and to disengage the upper end of the extension 34 from the gauge chuck 32 and bring the open end 18 of the bore 17 of the body 16 into engagement with the chuck 10. When this occurs the valve of the "insides" 36 is seated and the gauge is not in communication with the passage 22 or the tire while the valves of the chuck 10 and the "insides" 19 are unseated and air can flow from the supply hose 11 through the body 16 and hose 48 to the tire and the air pressure in the tire increased. Whenever the operator wishes to determine the air pressure in the tire he merely allows the body 16 and handle 27 to return to normal position under the action of the spring 41.

From the foregoing it will have been seen that the chucks 10 and 32 may be readily positioned in or removed from the inflator by loosening the setscrews 12 and 42 and that when they are mounted in the inflator and the setscrews tightened against the chucks the latter are positively locked in position. It is not necessary to disturb the assembled relationship of the sections 6 and 7 of the casing 5 to mount and clamp the chucks in the inflator. Also it will have been noted that the openings through the nuts 14 and 43 provide access for a tool to the "insides" 19 and 36 for purposes of removing or replacing the same. In addition it should be observed that the body 16 and associated extensions constitute an integral member.

Although an embodiment of the invention has been specifically described herein it should be understood that the invention is susceptible of such modifications and adaptations as come within the scope of the appended claims.

Having thus described my invention I claim:

1. A tire inflating device of the character specified comprising a two-part casing having complementary sections secured together, said casing being provided with a spherical cavity to receive a chuck and also with a second cavity in communication with the first named cavity, said casing sections being formed with complementary portions to provide an opening through the casing and communicating with said first cavity and with portions to non-rotatably receive a nut, a nut mounted in said last portions in axial alignment with said opening, a setscrew in said opening and nut, a body in said second cavity and having a bore therein arranged in axial alignment with said opening and shaped to receive a valve insides, said nut and opening being of a size such that said valve insides may be inserted in and removed from said bore through said nut and opening, said body at the open end of said bore being adapted to cooperate with said chuck.

2. A device of the character described comprising a two-part casing having complementary sections secured together, said sections being formed to provide a cavity for receiving an air gauge, said cavity including a spherical portion for the gauge chuck, said casing having a second cavity in communication with the spherical portion of the first cavity, said casing sections being formed with complementary portions to provide an opening through the casing into the spherical portion of the first cavity and with portions to non-rotatably receive a nut in axial alignment with said opening, a nut mounted therein, a setscrew in said nut for engaging the gauge chuck and positively locking the gauge in position, a body in said second cavity and having a bore therein arranged in axial alignment with said opening and shaped to receive a valve insides, said nut and opening being of a size such that said valve insides may be inserted in and removed from said bore through said nut and opening, said body at the open end of said bore being adapted to cooperate with said gauge chuck.

3. A tire inflating device of the character specified comprising a two-part casing having complementary sections secured together, said casing being provided with a cavity to receive a chuck and also with a cavity in communication with the first named cavity, said casing sections being formed with complementary portions to provide an opening through the casing and communicating with said first cavity and with portions to non-rotatably receive a nut, a nut mounted in said last portions in axial alignment with said opening, a body in said second cavity and having a bore therein arranged in axial alignment with said opening and said nut and which bore mounts a valve insides, said opening through the casing and through the threaded hole in the nut being of such diameter as to permit the passage of the valve insides therethrough.

JOHN C. CROWLEY.